US012671595B1

(12) United States Patent
Shirk et al.

(10) Patent No.: US 12,671,595 B1
(45) Date of Patent: Jun. 30, 2026

(54) EFFICIENT MANAGEMENT OF CERTIFICATES ON AN ENTERPRISE NETWORK

(71) Applicant: Tanium Inc., Emeryville, CA (US)

(72) Inventors: Kaitlyn Shirk, Gig Harbor, WA (US); Michael Ryan, Downers Grove, IL (US); William Green, Rolesville, NC (US); Eric Dutko, Hillsborough, NC (US)

(73) Assignee: Tanium Inc., Emeryville, CA (US)

( * ) Notice: Subject to any disclaimer, the term of this patent is extended or adjusted under 35 U.S.C. 154(b) by 102 days.

(21) Appl. No.: 18/676,502

(22) Filed: May 28, 2024

(51) Int. Cl.
| | |
|---|---|
| *H04L 9/32* | (2006.01) |
| *H04L 9/08* | (2006.01) |
| *H04L 9/40* | (2022.01) |

(52) U.S. Cl.
CPC .......... *H04L 9/3263* (2013.01); *H04L 9/0869* (2013.01); *H04L 9/3247* (2013.01); *H04L 63/0435* (2013.01)

(58) Field of Classification Search
CPC ... H04L 9/3263; H04L 9/0869; H04L 9/3247; H04L 63/0435
See application file for complete search history.

(56) References Cited

U.S. PATENT DOCUMENTS

| | | | |
|---|---|---|---|
| 10,485,536 | B2 | 11/2019 | Ming et al. |
| 11,172,470 | B1 | 11/2021 | Guieu et al. |

| | | | | |
|---|---|---|---|---|
| 11,258,654 | B1 | 2/2022 | Hindawi et al. | |
| 11,343,355 | B1 | 5/2022 | Goela et al. | |
| 11,888,997 | B1 * | 1/2024 | Bowen ................. | H04L 9/3247 |
| 12,174,979 | B2 * | 12/2024 | Hanna .................. | H04L 9/3268 |
| 12,231,577 | B2 * | 2/2025 | Hanna .................. | H04L 9/3247 |
| 2020/0153697 | A1 * | 5/2020 | Turner .................. | H04W 4/70 |
| 2022/0294640 | A1 * | 9/2022 | Hanna .................. | H04L 9/3247 |
| 2022/0343005 | A1 * | 10/2022 | Hanna .................. | G06F 21/6245 |
| 2025/0023714 | A1 * | 1/2025 | Kumar ................. | H04L 9/0819 |
| 2025/0106044 | A1 * | 3/2025 | Golden ................ | H04L 9/3268 |
| 2025/0141696 | A1 * | 5/2025 | Elemenshawy ....... | H04L 9/3247 |

OTHER PUBLICATIONS

"New Tanium Security Operations for ServiceNow Gives Organizations a Powerful Cybersecurity Solution," Apr. 11, 2024, 9 pages, Tanium Inc., downloaded from https://www.tanium.com/blog/tanium-security-operations-for-servicenow-cybersecurity-solution/.

(Continued)

*Primary Examiner* — Cheng-Feng Huang
(74) *Attorney, Agent, or Firm* — Nicholson De Vos Webster & Elliott LLP

(57) ABSTRACT

Implementation(s) for acquiring new certificates on behalf of managed endpoints. For example, new certificates are acquired by: identifying a managed endpoint associated with a current certificate and corresponding current private key to be renewed; sending a first one or more messages to the managed endpoint to cause the managed endpoint to generate information needed to acquire a new certificate; providing the information to a certificate authority (CA) and receiving a corresponding new certificate from the CA on behalf of the managed endpoint; and sending one or more messages to the managed endpoint to replace the current certificate and current private key with the new certificate and a new private key, respectively.

18 Claims, 11 Drawing Sheets

(56) References Cited

OTHER PUBLICATIONS

"Ultimate Guide to AI Cybersecurity: Benefits, Risks, and Rewards," Jan. 17, 2024, 13 pages, Tanium Inc., downloaded from https://www.tanium.com/blog/ai-cybersecurity-guide/.

"What is Identity and Access Management (IAM)?" Apr. 9, 2024, 14 pages, Tanium Inc., downloaded from https://www.tanium.com/blog/what-is-identity-and-access-management/.

"What is Security Automation? Benefits, Importance, and Features," Mar. 21, 2024, 14 pages, Tanium Inc., downloaded from https://www.tanium.com/blog/what-is-security-automation/.

H. Krawczyk et al., "HMAC-based Extract-and-Expand Key Derivation Function (HKDF)," May 2010, 14 pages, RFC 5869.

* cited by examiner

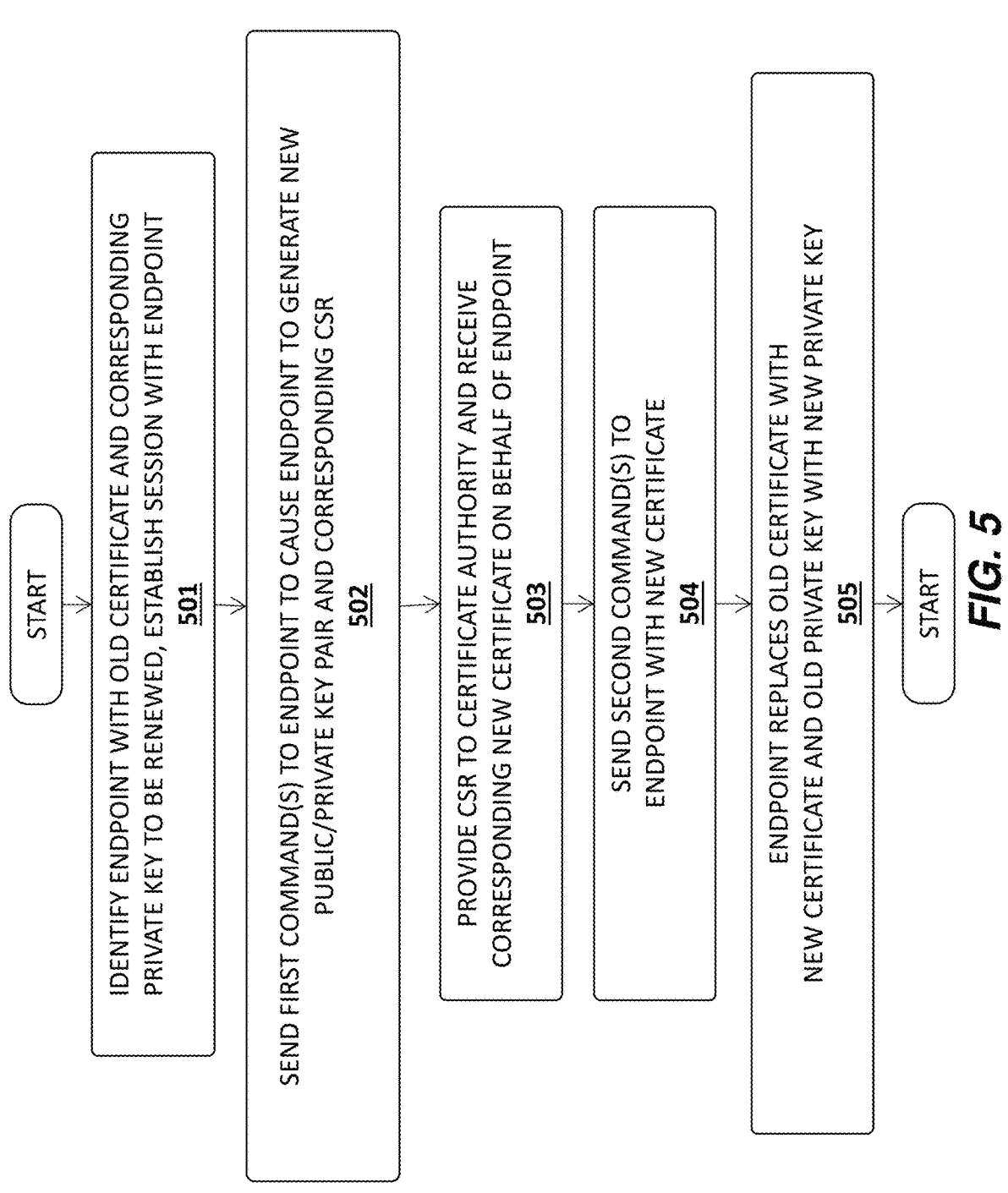

START

IDENTIFY ENDPOINT WITH OLD CERTIFICATE AND CORRESPONDING PRIVATE KEY TO BE RENEWED, ESTABLISH SESSION WITH ENDPOINT
501

SEND FIRST COMMAND(S) TO ENDPOINT TO CAUSE ENDPOINT TO GENERATE NEW PUBLIC/PRIVATE KEY PAIR AND CORRESPONDING CSR
502

PROVIDE CSR TO CERTIFICATE AUTHORITY AND RECEIVE CORRESPONDING NEW CERTIFICATE ON BEHALF OF ENDPOINT
503

SEND SECOND COMMAND(S) TO ENDPOINT WITH NEW CERTIFICATE
504

ENDPOINT REPLACES OLD CERTIFICATE WITH NEW CERTIFICATE AND OLD PRIVATE KEY WITH NEW PRIVATE KEY
505

START

*FIG. 5*

EFFICIENT MANAGEMENT OF CERTIFICATES ON AN ENTERPRISE NETWORK

TECHNICAL FIELD

One or more embodiments relate to the field of endpoint management; and more specifically, to the efficient management of endpoint certificates on an enterprise network.

BACKGROUND ART

Information Technology (IT) teams are tasked with managing an organization's enterprise network. Such networks include various types of electronic devices. Often, at least some of these electronic devices can be managed via the combination of: 1) client software installed on the electronic devices that communicates with; 2) server software (also referred to as the management server or management service) configured within the enterprise network and/or on a Cloud-based platform coupled to the enterprise network. For example, during operation, the client software (on its own initiative and/or responsive to the server software) on a given electronic device collects information regarding the current state (also referred to as state information) of that electronic device and reports that information back to the server software; also via the server software, the IT team can cause changes to the configuration of the electronic devices. Electronic devices managed in this manner are referred to as managed devices, managed electronic devices, or managed endpoints, while a network managed in this way is often referred to as a managed network. However, even though the term "managed network" may be used to refer to an organization's network managed in the above manner, not all electronic devices connected to the network are necessarily managed using such client software installed on those electronic devices.

The various types of electronic devices in a network can include what are sometimes referred to as endpoint devices or endpoints (also referred to as endpoint electronic devices) and network devices (also referred to as network electronic devices). The above-described client software installed on these endpoint devices is sometimes referred to as endpoint management client software or endpoint management software.

Endpoints within an organization may use asymmetric key pairs for authentication and encryption. An asymmetric key pair (KeyPair) comprises a private key (PrivK) and a public key (PubK). A certificate signing request (CSR) with the public key is sent to a certificate authority (CA), and in response the CA sends back a certificate (Cert). An endpoint can sign a message using its PrivK and send the message, signature, and Cert to another entity. With this information, the entity can confirm the endpoint was the sender of the message and the message has not been altered. The entity can also prepare a response, encrypt the response with the PubK in the Cert, and send the encrypted response back to the endpoint. The endpoint can decrypt the response with its PrivK.

To improve security, asymmetric key pairs are assigned an expiration date, and should be renewed/replaced before expiration (the terms renewed and replaced are used interchangeably herein). For many enterprises today, certificate renewal is a manual, tedious process that requires cross-coordination within IT teams and may take up to an hour to replace just a single certificate for one service. However, as companies scale and have hundreds of thousands of services to manage, manual certificate renewal becomes an impossible task. While management software (e.g., running on management servers/services) may provide visibility into the certificates in a managed network (e.g., to identify the existing certificates and when they expire), existing implementations do not provide mechanisms for renewing certificates.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

FIG. 5 illustrates a method in accordance with some embodiments.

DETAILED DESCRIPTION

Figure 1:
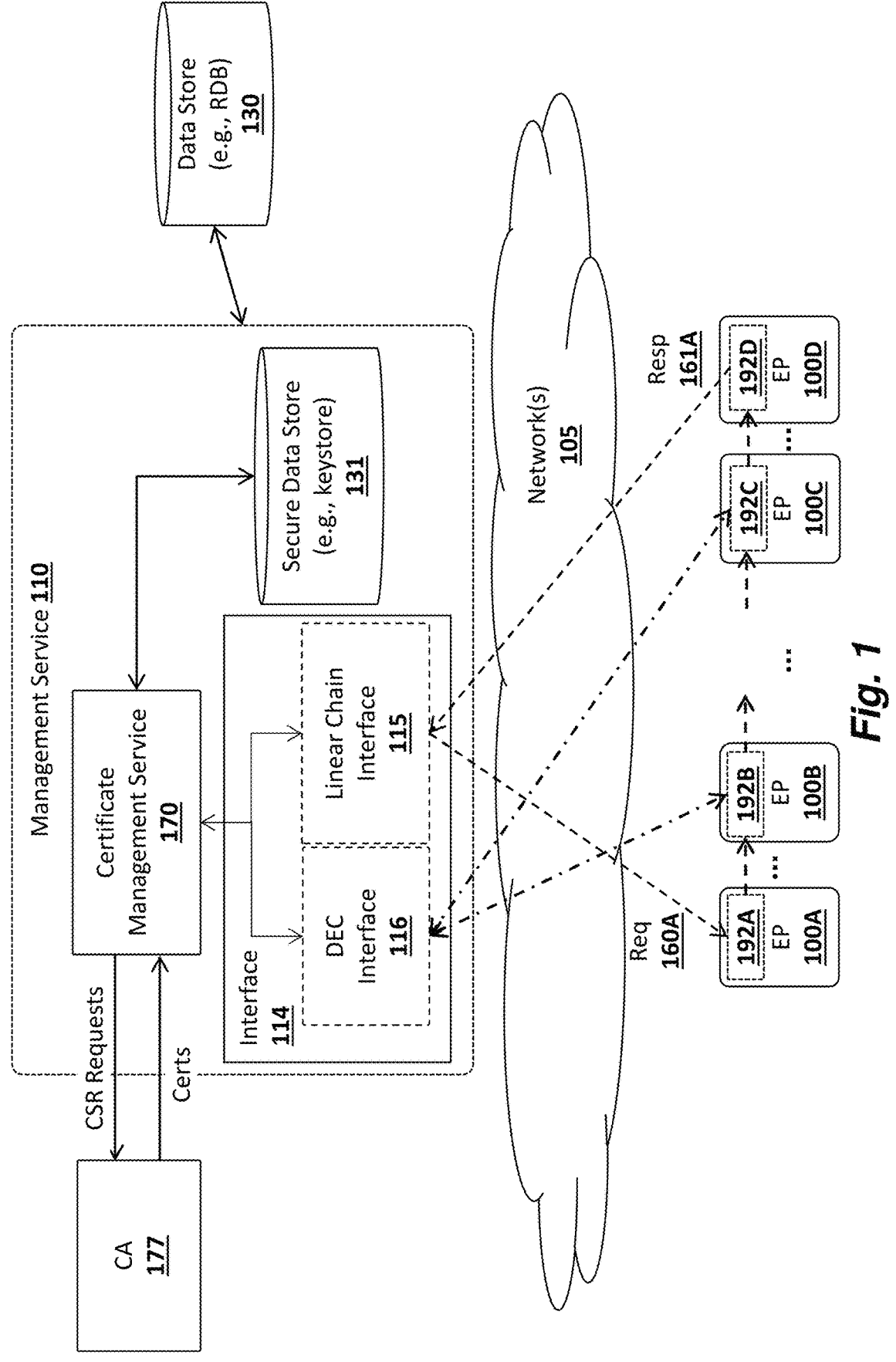
FIG. 1 provides an overview of a management service 110 with a certificate management service 170 for implementing certificate management operations in accordance with the embodiments described herein.

In the following disclosure, various embodiments are described for renewing and managing certificates assigned to endpoints on a managed network. Client management software on the endpoints communicates with a management service to renew assigned KeyPairs upon expiration. The management service may be configured on servers within an organization's network, in the Cloud, or a combination thereof (e.g., where the management service includes a combination of local and cloud-based components). The client management software may be configured with a certificate management extension which triggers the endpoints to generate new KeyPairs and corresponding certificate signing requests (CSRs) and the management service manages the acquisition of a corresponding new certificate, performing validation checks at various stages.

In some implementations, the management service includes or is coupled to a certificate management service for connecting with the certificate manager extension of each endpoint and performing various certificate management operations. For example, the certificate management service may request an endpoint's certificate manager extension to cause a new public/private KeyPair and a new CSR to be generated on the endpoint, which the certificate management service provides to a Certificate Authority (CA) to acquire a new certificate on behalf of the endpoint. Before sending the CSR to the CA, the certificate management service may optionally perform security checks such as validating the certificate chain, verifying the signature sent by each endpoint, and/or tracking the behavior of any compromised endpoints. After receiving a new certificate from the CA, the certificate management service communicates with the certificate manager extension of the endpoint to securely replace the old certificate with the new certificate (e.g., following additional validation checks).

In some embodiments, the certificate management service initially performs an audit of the various endpoints to identify each endpoint's certificate status, which it stores in a database for subsequent use. It then proceeds with the certificate renewal process on behalf of those endpoints with expired certificates or certificates which are approaching expiration, updating each endpoint's certificate status in the database as it proceeds. The end result is a comprehensive view of the certificate status for all managed endpoints.

This approach provides several advantages. For example, the automation related to certificate renewal significantly reduces the level of effort required to renew and manage KeyPairs and certificates as compared to existing implementations where these tasks must be performed manually at the endpoints. Additionally, centralizing the CSR and the associated certificate processing operations provides visibility as to which endpoints are using which KeyPairs as well as the ability to distribute relevant security information to the endpoints.

In the following description, a KeyPair currently being used by an endpoint may be referred to as the existing or current KeyPair (cKeyPair), and thus there is a current PrivK (cPrivK), PubK (cPubK), and Cert (cCert). Assume an endpoint has been using a first asymmetric key pair (fKeyPair), which includes a first PrivK (fPrivK) and a first PubK (fPubK), and a first Cert (fCert) based on fPubK. Also assume that the endpoint needs to replace/renew cKeyPair, meaning that fKeyPair will become an old or prior KeyPair and a new second KeyPair will become cKeyPair. The second KeyPair (sKeyPair), with a second PrivK (sPrivK) and second PubK (sPubK), will be generated, and then a CSR for the sPubK will be generated and sent to a CA. In response, the CA which will generate a new second Cert (sCert). Upon receipt of the sCert, the endpoint can start using the sKeyPair. As such, the fKeyPair becomes an old KeyPair (oKeyPair), and the sKeyPair becomes the cKeyPair.

FIG. 1 provides an overview of a management service 110 with a certificate management service 170 for implementing certificate management operations in accordance with the embodiments described herein. The management service 110 includes an interface 114 for communicating with managed endpoints 100A-D.

While each of the endpoints 100A-100D may be an electronic device, alternative embodiments are implemented to participate at a lower level of granularity (e.g., if a given electronic devices supports virtualization (see additional discussion below), then each of a set of one or more software containers hosted on that electronic device may be separately considered an endpoint). In such embodiments, there may be only one instance of the client management software 192 per endpoint and per electronic device, or one per software container hosted on each electronic device. The term electronic device is defined in more detail below.

Each of the endpoints 100A-100D has client management software 192 installed on it. The management software, when executed by one of the endpoints, causes the endpoint to: 1) scan that endpoint to collect information regarding the current state of that endpoint; and 2) communicate that information out of that endpoint.

Depending on the embodiment, interface 114 and manner of communicating with the client management software 192 may be implemented in one or multiple different ways. For example, in some embodiments the interface 114 includes both: 1) a direct endpoint connection (DEC) interface 116 for connecting directly with client management software 192A-D running on the individual endpoints 100A-D, respectively; and 2) a linear chain interface 115 for connecting with the client management software 192A-D in accordance with a linear chain protocol, relevant details of which are provided below. Briefly, in a typical linear chain transaction, the management service 110 transmits a request message 160A towards client management software 192A of a first endpoint 100A (sometimes referred to as the "head" endpoint) and receives a corresponding response message 161A from the management software 192D of a final endpoint 100D in the linear chain (sometimes referred to as the "tail" endpoint). Between the first endpoint 100A and the final endpoint 100D, a message corresponding to the request is passed sequentially through each endpoint 100B-C. In response, the respective endpoint performs the operations specified in the message and/or collects information requested by the message, which is then added to the message before it is passed to the next endpoint in the linear chain. Thus, the response message 161A includes information accumulated from each of the endpoints 100A-D in the linear chain.

In some implementations, the management service 110 automatically selects the interface 115-116 to use based on the type of data being requested from the corresponding endpoint(s) 100A-D. For example, a large amount of data from a specific endpoint will be more efficiently retrieved via the DEC interface 116 whereas a request for a large number of relatively small items of data from multiple endpoints will be more efficiently acquired via the linear chain interface 115. With respect to certificate management, for example, the certificate management service 170 may use the linear chain interface 115 to perform the initial audit to gather certificate information for all of the various endpoints 100A-D (e.g., certificate expiration dates), and then use the DEC interface 116 for the certificate renewal process with each endpoint. It should be noted, however, that the underlying principles of this disclosure are not limited to any particular interface used to connect to endpoints.

The management service 110 and endpoints 100A-D are interconnected through one or more networks, represented simply as network 105 in FIG. 1. For example, the endpoints 100A-D may be coupled to the same local area network (e.g., an Ethernet LAN with WiFi access points) and/or different endpoints may be coupled to different local area networks of an enterprise network or wide area network (WAN). Some of the endpoints 100A-D may be coupled to the enterprise network via a remote connection (e.g., a high speed Internet connection of a corresponding user's home). In some implementations the management service 110 is implemented as a Cloud service which is made accessible to the endpoints 100A-D via the Internet (or other high speed public or private network). Thus, the endpoints 100A-D may be coupled to the management service 110 through a multitude of communication channels and using various types of network devices (e.g., gateways, network routers, switches, bridges, cable Interconnect connections, etc). These specific details are not highlighted here because they are irrelevant to the underlying principles of this disclosure, which are orthogonal to the particular network connections used. Note that while only four endpoints 100A-D are illustrated for simplicity, hundreds or thousands of endpoints in potentially dispersed geographical locations may be managed by the management service 110.

In some embodiments, the certificate management service 170 executes the operations described below to track the certificates assigned to the various endpoints 100A-D and, when necessary, to facilitate renewals of the certificates by communicating with a certificate authority (CA) 177 on behalf of the endpoints 100A-D. In some embodiments, the management service 110 implements a secure data store 131 for storing encrypted private keys of the endpoints 100A-D and other highly sensitive data related to endpoint security. The management service 110 may store various other forms of endpoint data within a data store 130 such as a relational database.

Figure 2A:
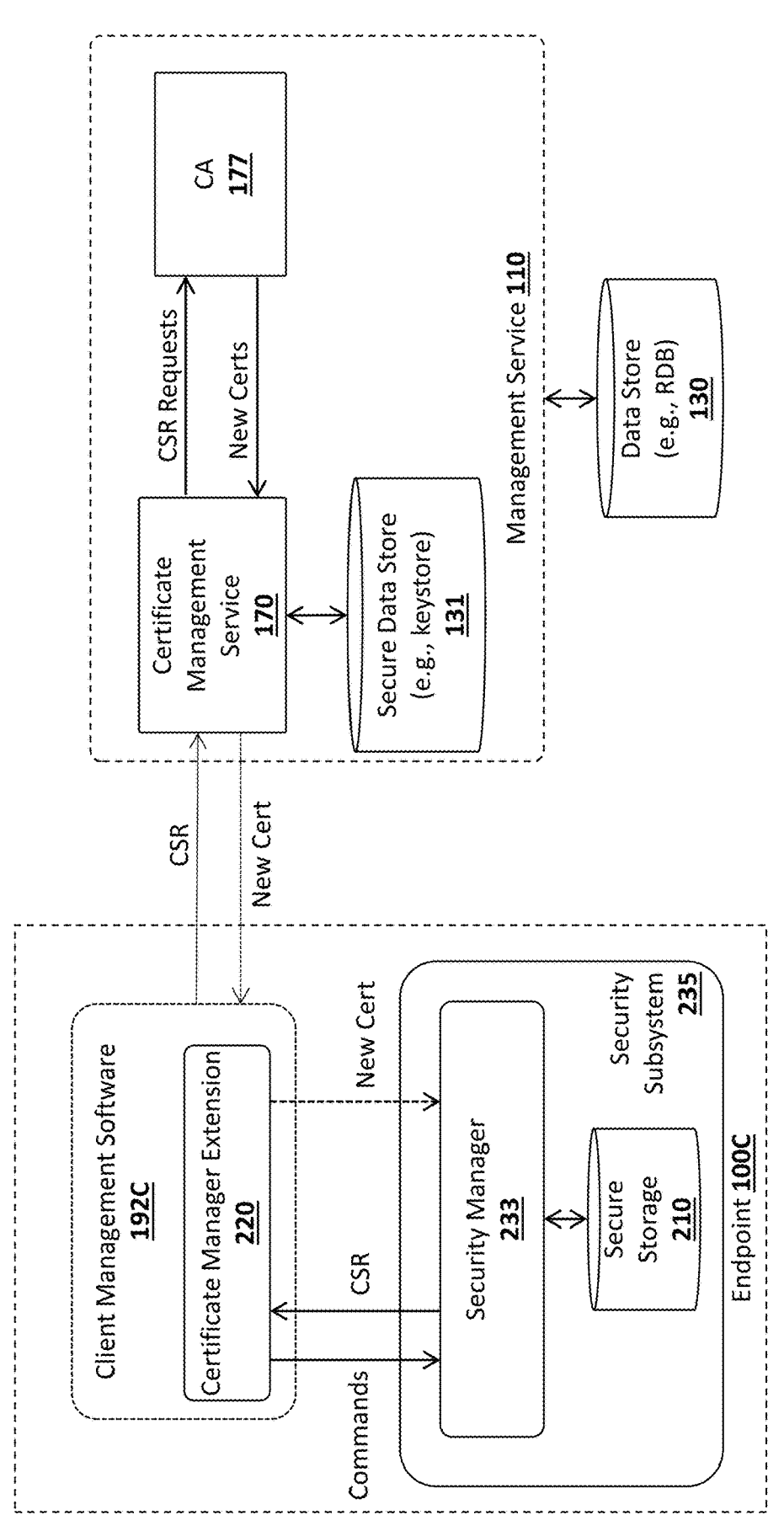
FIG. 2A illustrates an example endpoint 100C with a security subsystem 235 including a security manager 233 for performing key-based operations such as generating public/private key pairs, symmetric keys, and certificate signing requests (CSRs) as described herein.

FIG. 2A illustrates an example endpoint 100C with a security subsystem 235 including a security manager 233 for performing key-based operations such as generating public/private key pairs, symmetric keys, and certificate signing requests (CSRs) as described herein. The particular type of security subsystem 235 and security manager 233 will depend on the type of endpoint 100C (e.g., the architecture and version of the endpoint's processor, operating system, and security firmware). In many of these implementations, the security manager 233 is implemented with a combination of hardware (e.g., a microcontroller) and secure software and/or firmware to regulate access to a secure storage 210 which stores the keys, certificates, and other sensitive information used by the endpoint 100C for secure transactions. Where the security subsystem includes a hardware-based security manager, it is used to restrict access to encryption keys and certificates.

In some embodiments, the client management software 192C/D includes a certificate manager extension 220 which sends requests and receives responses from the security manager 233, operating as a local intermediary between the certificate management service 170 of the management service 110 and the security manager 233. The certificate manager extension 220 may issue commands through an API exposed by the security manager 233 to perform the various operations described herein, including generating a new public/private key pair, generating a symmetric key, and generating a corresponding CSR. In some implementations, the client management software 192C/D is registered on the endpoint 100C as a trusted entity, running at a sufficient privilege level to send commands to the security manager 233 to perform these operations.

Figure 2B:
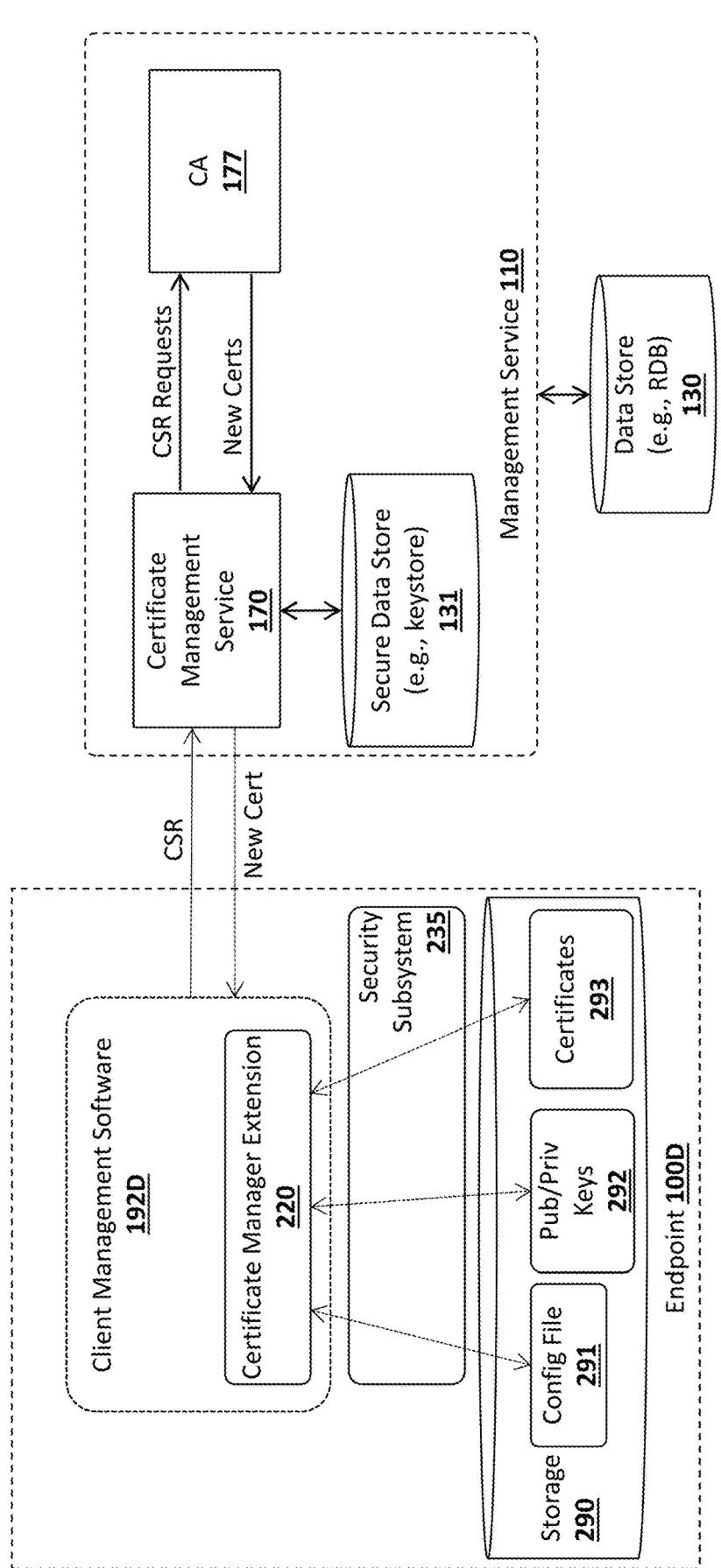
FIG. 2B illustrates another type of endpoints which does not include an integrated security manager but includes a security subsystem 235 (e.g., within the endpoint operating system or virtualization architecture) to regulate access to sensitive data using access permissions or similar mechanisms.

FIG. 2B illustrates another type of endpoints which does not include an integrated security manager but includes a security subsystem 235 (e.g., within the endpoint operating system or virtualization architecture) to regulate access to sensitive data using access permissions or similar mechanisms. For such endpoints, the certificate manager extension 220 may directly access the public/private keys 292 and certificates 293 from the endpoint storage device 290 if it is assigned sufficient access privileges within the security subsystem 235. On some platforms, for example, the certificate manager extension 220 determines the storage location of the public/private keys 292 and certificates 293 from a configuration file 291 and then reads the public/private keys 292 and certificates 293 from the specified location. In these implementations, the certificate manager extension 220 may initially be required to submit authentication credentials to the security subsystem 235 to access the configuration file 291 and/or the public/private keys 292 and certificates 293 (e.g., authentication credentials which provide a sufficient privilege level to access these locations).

By way of example, and not limitation, private keys stored without password protection and/or stored as files on the endpoint's storage device 290 or in the Windows LocalMachine store can be accessed by the certificate manager extension 220 running with sufficient access privileges. The following are examples of platforms in which the keys and certificates can be read directly from the endpoint storage at the indicated locations (i.e., when the requesting entity is running at a privilege level with the necessary access privileges):

Apache HTTPd—parse configuration file 291 to identify public/private keys 292 and certificates 293.

Nginx—parse configuration file 291 to identify public/private keys 292 and certificates 293.

Regardless of the connection mechanisms used by the certificate manager extension 220, when the existing public/private key pair of the endpoint 100C needs to be updated (e.g., because the current public/private key pair has expired or has been compromised, because the corresponding user is leaving the organization, etc), the certificate management service 170 sends a request to the certificate manager extension 220 to cause a new public/private key pair and corresponding CSR to be generated. For an endpoint as in FIG. 2A, the certificate manager extension 220 sends requests or makes calls to the security manager 233 to perform these operations and provide results. For an endpoint as in FIG. 2B, the certificate manager extension 220 calls the security subsystem 235 to perform these operations or may perform the operations itself, depending on the implementation.

Once the new public/private key pair and CSR are generated, the certificate manager extension 220 passes the CSR to the certificate management service 170 which uses the CSR to issue a corresponding CSR message to the CA 177 on behalf of the endpoint 100C. The CA 177 responsively generates and returns a new certificate. In some embodiments, the certificate management service 170 stores the new certificate in the data store 130 (e.g., a relational database for storing endpoint data) and stores the corresponding private key in a secure data store 131 (e.g., storage device configured with additional access protection mechanisms to protect security data and other highly sensitive information). The certificate management service 170 communicates the new certificate to the client management software 192C, which the certificate manager extension 220 passes to the security manager 233 (for endpoints such as in FIG. 2A) or stores directly on the endpoint 100C in accordance with the access permission granted by the security subsystem 235 (for endpoints such as in FIG. 2B). The new certificate then replaces the old certificate (e.g., following validation checks) and can be used by the endpoint 100C for participating in secure transactions (e.g., encryption, decryption, signature generation, etc, using the new key pair and certificate). Validation checks may be performed at the different stages of this process (as described in greater detail below), ultimately resulting in a new public/private key pair and corresponding certificate for the endpoint 100C.

Some embodiments of the certificate manager extension 220 is configurable for pluggable functional replacements/additions for use with specific endpoint platforms and services. For example, for endpoints 100D such as in FIG. 2B, the certificate manager extension 220 may be configured to authenticate with the security subsystem 235 and, when access is granted, locate the necessary files in the endpoint storage, potentially by reading a configuration file 291 to determine the location of the public/private keys 292 and certificates 293. The certificate manager extension 220 may be configured with the functional program code and/or scripts necessary to directly locate and access the public/private keys 292 and certificates 293. A strategy for these configurations may simply be to backup and replace these files when necessary, and issue the appropriate reload commands. Other platforms such as in FIG. 2A have configurations in which the public/private keys and certificates are stored in a secure storage only accessible via a security manager 233. For these endpoint types, the certificate manager extension 220 will be configured as required to make calls to the security manager and receive responses (e.g., via a combination of access privilege settings and encryption to access an API exposed by the security manager 233). In some implementations, for example, the certificate manager extension 220 may be registered on the endpoint 100C as a trusted entity and/or be executed at a sufficient privilege level to generate commands via the API of the security manager 233. As new security technologies are introduced on new endpoints, the certificate manager extension 220 may be updated with additional functionality to allow it to access the endpoint keys and certificates.

Figure 3A:
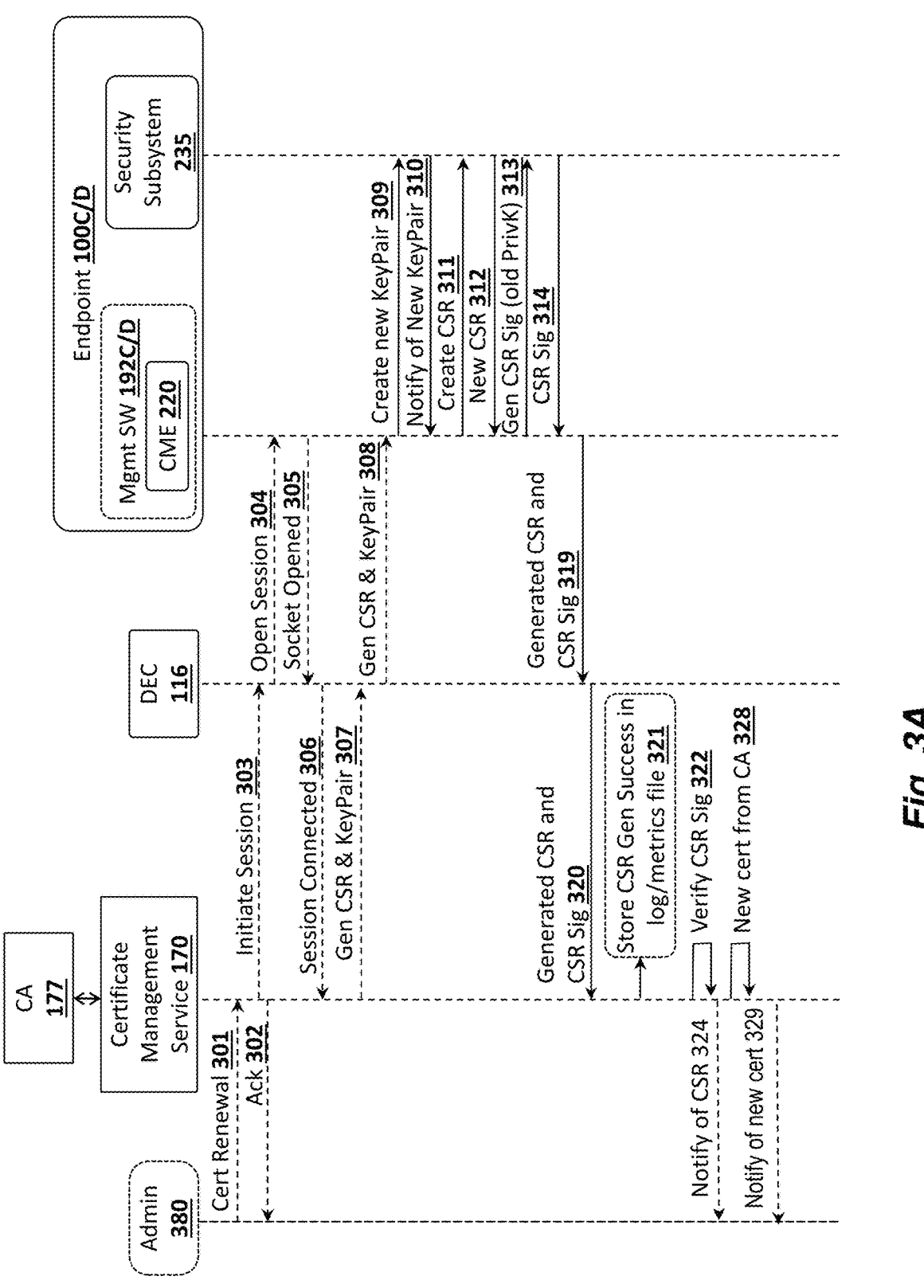
FIG. 3A illustrates a transaction sequence for acquiring endpoint certificates on behalf of endpoints in accordance with embodiments of the invention.

FIG. 3A illustrates a transaction sequence for acquiring endpoint certificates on behalf of endpoints in accordance with embodiments of the invention. The transaction sequence may be initiated, for example, when a network administrator 380 (or other authorized user) chooses to renew certificates for one or more endpoints 100C/D. This may be done, for example, via a network management console or an endpoint with an authorized management connection to the management service 110 (e.g., following a successful authentication of the network administrator 380). In some embodiments, a graphical user interface workspace is provided, allowing the network administrator 380 (sometimes simply referred to as "network admin" or "admin") to view and manage certificate configuration profiles for the various endpoints 100A-D. For example, the set of endpoints with expired, soon to be expired certificates, or certificates which otherwise need to be renewed (e.g., because they have been compromised, because the user is departing the organization, etc.) may be highlighted in a separate list, with selectable options to initiate a certificate signing request (CSR) for the corresponding certificates. The user interface may also display a list of pending CSRs the certificate management service has already received from endpoints, along with their current status, an indication of when the current certificate expires, and affordances for downloading the CSR and uploading the corresponding certificate when the CSR is fulfilled. Various other information and options may be provided via the GUI.

While some embodiments include interactions with a network administrator 380 triggering certificate renewal operations, other embodiments perform this triggering automatically (e.g., based on a schedule). In one implementation, for example, the management service 110 collects expiration information for the public/private keys and corresponding certificates on each endpoint device 100A-D, and automatically initiates updates to the keys and certificates prior to the respective expiration dates. Thus, in these embodiments, the network administrator 380 may be replaced with an event trigger from the management service 110.

A certificate renewal request 301 is received by the certificate management service 170, which responds with an acknowledgement 302 and initiates a session with the client management software 192C/D on the endpoint 100C/D. In an embodiment in which CSRs are automatically triggered, the certificate renewal request 301 and acknowledgement 302 may be replaced by a call to the certificate management service 170 to perform the certificate renewal(s). In the illustrated example, an initiate session message 303 is transmitted to the DEC interface 116, which passes a corresponding open session message 304 to the client management software 192C/D. The client management software 192C/D confirms the connection, transmitting a "socket opened" message 305 and the DEC interface 116 transmits a corresponding session connected message 306 to notify the certificate management service 170. While the DEC interface 116 is used in this example, the same sequence of operations may be performed via any interface type.

The certificate management service 170 transmits a request message 307 to generate a new public/private key pair and corresponding CSR and the DEC interface 116 transmits a corresponding message 308 to the client management software 192C/D of the endpoint 100C/D. The certificate manager extension 220 generates a sequence of messages, including a first message 309 instructing the security subsystem 235 to create a new public/private key pair, a second message 311 instructing the security subsystem 235 to generate a new CSR, and a third message 313 instructing the security subsystem 235 to generate a signature over the CSR (using the old private key). In response to the first message 309, the security subsystem 235 generates a new public/private key pair and sends a notification 310 to the certificate manager extension 220. In response to the second message 311, the security subsystem 235 generates a new CSR, which it provides to the certificate manager extension 220 at 312. In response to the third message 313, the security subsystem 235 generates a signature over the CSR (using the old private key) and provides it to the certificate manager extension 220 at 314.

The generated CSR and signature over the CSR are transmitted to the certificate management service 170 via the DEC interface 116, via messages 319-320. Optionally at 321, the certificate management service 170 may record an indication of a successful CSR generation in a log/metrics file (or other data structure). Additionally or alternatively, other events (cert generation, cert distribution, etc.) (not shown) may be recorded in this manner.

The certificate management service 170 verifies the signature at 322 (e.g., using its copy of the endpoint's old public key), and then communicates with the certificate authority (CA) 177 to have a new cert generated 328. With regard to CA 177, certificate management service 170 establishes a communication channel with the certificate authority (CA) 177 (e.g., initially providing authentication credentials), and sends the CA a message with the CSR. The CA 177 responds with a message to the certificate management service 170 including the new certificate, or indicating a network location from which to retrieve the certificate (e.g., a URL or other form of network address).

Optionally at 324 and/or 329, the certificate management service 170 may notify admin 380 of the CSR and new cert, respectively. Additionally or alternatively, admin 380 may be notified of other events (cert distribution, etc.) (not shown).

Figure 3B:
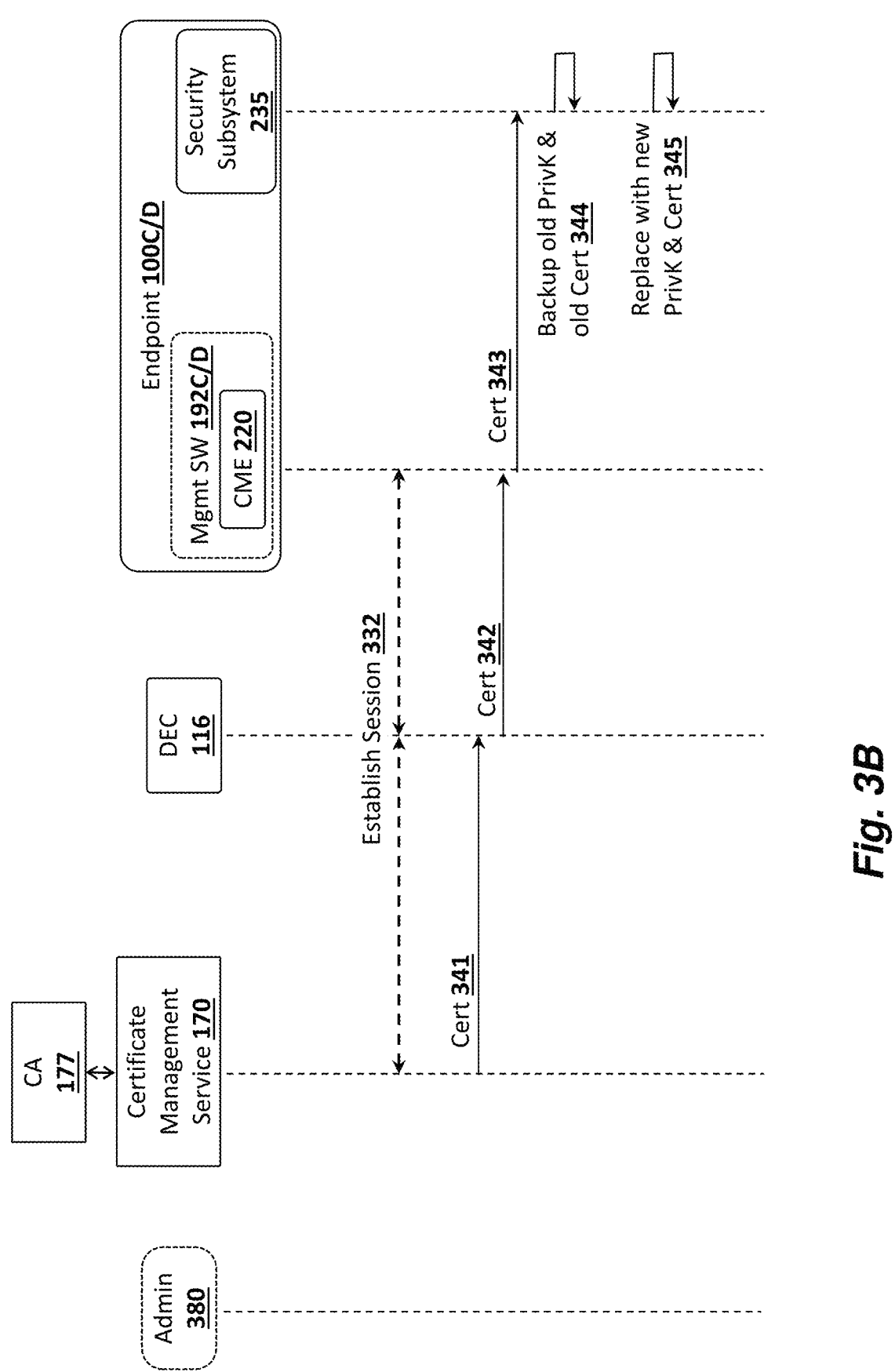
FIG. 3B illustrates a continuing sequence of operations to distribute the new certificate to endpoints according to some embodiments.

FIG. 3B illustrates a continuing sequence of operations to distribute the new certificate to endpoints according to some embodiments. After establishing a session with the endpoint 100C/D at 332 (and potentially performing one or more ID challenge (or other authentication) operations as described further below), the certificate management service 170 transmits the new certificate through the DEC interface 116 at 341-342 and the certificate manager extension 220 communicates the new certificate to the security subsystem 235 of the endpoint 100C/D at 343. In some embodiments, the certificate manager extension 220 makes a call to the security subsystem 235 indicating a location from which to access the new certificate (e.g., a memory location on the endpoint 100C/D or a network location) and instructing the security subsystem 235 to install the new certificate. At 344, the security subsystem 235 makes a backup copy of the old private key and old certificate and, at 345, replaces the old private key and certificate with the new private key and certificate, respectively. While some embodiments establish a session at 332, in others a previously established session (e.g., the session established in 303-306) that is still active is reused.

Figure 4A:
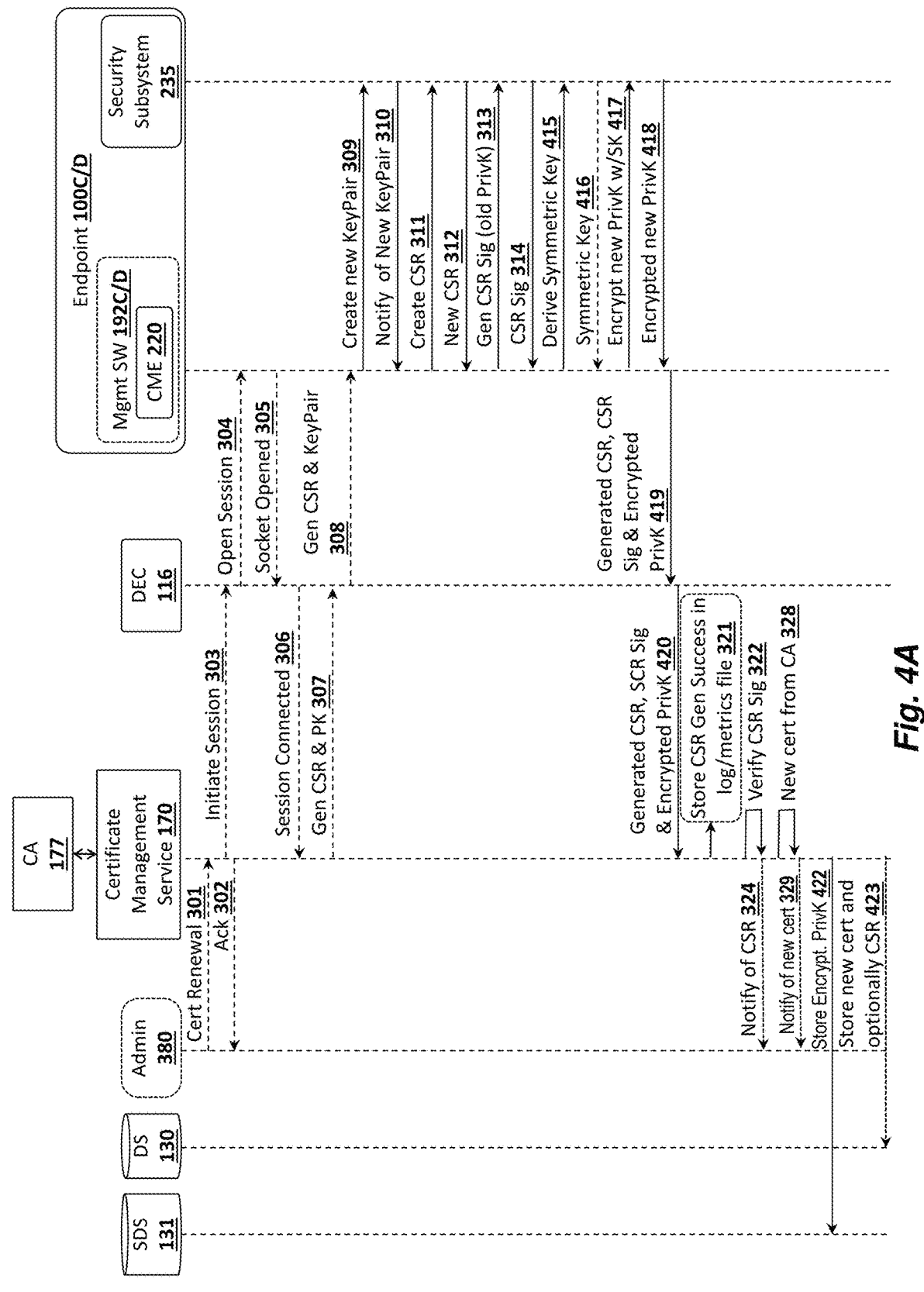
FIG. 4A illustrates another transaction sequence for acquiring endpoint certificates on behalf of endpoints in accordance with embodiments of the invention.

FIG. 4A illustrates another transaction sequence for acquiring endpoint certificates on behalf of endpoints in accordance with embodiments of the invention. FIG. 4A illustrates is similar to FIG. 3A, but has some additional operations for securely providing the certificates to endpoints which share public/private key pairs.

Specifically, FIG. 4A: 1) includes operations 310-314 and 321-329; 2) adds operations 415-419 an d422-423; and 4) modifies operations 319-320. The certificate manager extension 220 is shown generating two additional messages. A fourth message 415 instructing the security subsystem 235 to derive a symmetric key, and a fifth message 417 instructing the security subsystem 235 to encrypt the new private key using the symmetric key. In response to the fourth message 415 and the fifth message 417, security subsystem 235 derives a symmetric key from the old public key, optionally sends the symmetric key to certificate manager extension 220 at 416, encrypts the new private key with the symmetric key, and sends the encrypted new private key to certificate manager extension 220 at 418.

In some embodiments, the symmetric key is derived from the old private key using HKDF (Hashed message authentication code Key Derivation Function, as described in RFC 5869). A random salt may be used as input to HKDF along with the existing private key to generate the symmetric key. In some cases, the random salt may not be used or may be kept secret. In embodiments where a random salt is used, it is distributed to those entities which will require it to derive the symmetric key, such as other endpoints (e.g., 100A-B) which share public/private key pairs and/or the certificate management service 170. The random salt may be distributed via a separate secure communication channel or transaction between the endpoint 100C/D and the other entities. For example, before or during the certificate renewal process, the salt may be encrypted with the old public key of the shared key pair and securely distributed to any entity (e.g., another endpoint 100A/B) with a copy of the old private key, which the entity can use to decrypt the salt and derive the symmetric key using the old private key and the salt.

Thus, while in some implementations, each endpoint has its own key pair (and thus, its own private key), in other implementations, a plurality of endpoints share a key pair. In these cases, each endpoint can derive the symmetric key using the old private key and salt (if used), which may be securely distributed to these endpoints. The salt may be encrypted with the old shared public key, and sent (directly, via broadcast, or through the management service) to the other endpoints; which can then decrypt it with the old shared private key. Note that in these implementations, the management service need not have an unencrypted version of the salt, the symmetric key, or any of the private key(s) of the endpoints.

If the security subsystem 235 includes a security manager 233 as in FIG. 2A, the security manager 233 receives the requests from the certificate manager extension 220 and performs each of the requested operations. If the security subsystem 235 does not include a security manager, as in FIG. 2B, then the commands may be executed by the security subsystem 235 or by the certificate manager extension 220 itself.

Returning to FIG. 4A, the operations 319-320 are modified to form 419-420 in that the encrypted private key is sent with the CSR and CSR signature to certificate management service 170.

At 422, the certificate management service 170 stores the encrypted private key in the secure data store 131; and stores the new cert and optionally the CSR in the data store 130 at 423.

The sequence of operations in FIG. 4A would continue as is shown in FIG. 3B to distribute the to distribute the new certificate to the endpoint that generated the new private key.

Figure 4B:
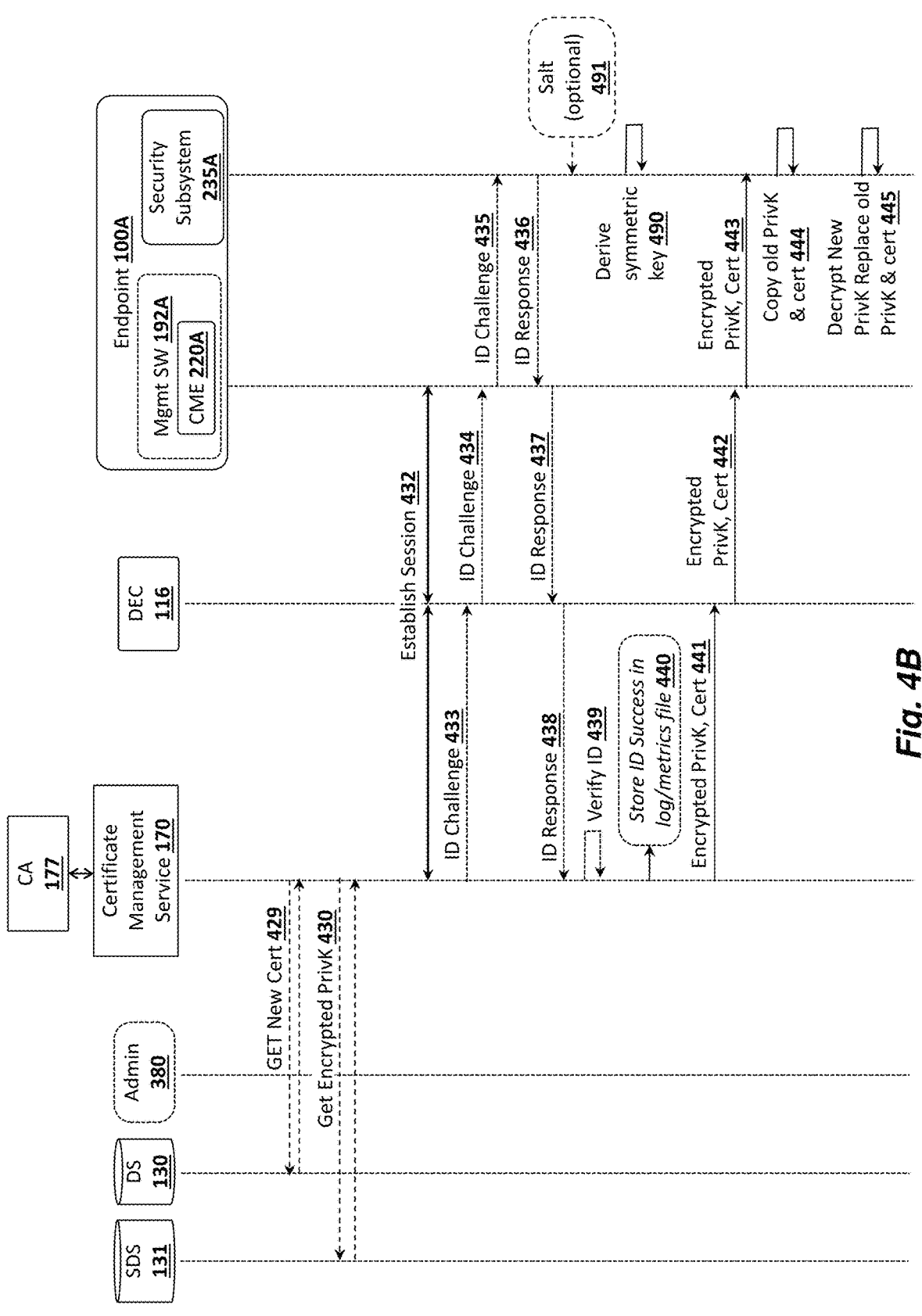
FIG. 4B illustrates a sequence of operations to distribute the new key pair (private key and cert) on a different endpoint 100A than the endpoint 100C/D which generated the new public/private key pair and CSR in FIG. 4A.

FIG. 4B illustrates a sequence of operations to distribute the new key pair (private key and cert) on a different endpoint 100A than the endpoint 100C/D which generated the new public/private key pair and CSR in FIG. 4A. In some embodiments, the admin 480 may trigger the certificate management service 170 to access the new cert and encrypted new private key at 429 and 430, respectively. As mentioned, the operations of the admin 480 may instead be triggered automatically from the certificate management service 170 (e.g., based on executing program code). For example, certificate management service 170 may maintain in a data structure indications of which endpoints share the key pair with endpoint 100C/D, and thus automatically initiate the distribution of the new key pair those endpoints. In the example shown in FIG. 4B, responsive to the new key pair being generated for endpoint 100C/D and the data structure indicating that endpoints 100A and 100C/D share a key pair, certificate management service 170 may automatically initiate the distribution of the new key pair to endpoint 100A. In such a case, certificate management service 170 may not need to perform 429 and 430 because it distributes these to endpoint 100A at the same time, overlapping in time, or right after the operations in FIG. 3B.

The certificate management service 170 establishes sessions with one or more endpoints, represented simply by endpoint 100A in FIG. 4B, which share public/private key pairs with endpoint 100C/D. The same set of transactions may be performed with any other endpoints which share the same public/private key pair (e.g., endpoint 100B).

After establishing a session with the endpoint 100A at 432, the certificate management service 170 optionally authenticates the endpoint 100A by generating and transmitting an identity challenge which is sent through the DEC interface 116 at 433-434 and passed from the certificate manager extension 220A to the security subsystem 235A of the endpoint 100A at 435. In one embodiment, the identity challenge is a nonce which the security subsystem 235A of the endpoint 100A signs with the old private key and returns the signature at 436-438. The certificate management service 170 verifies the signature using the old public key at 439 (and optionally stores an indication of the successful identity challenge in the log file or other data structure for storing metrics 440).

The certificate management service 170 transmits the encrypted new private key and the new certificate through the DEC interface 116 at 441-442 and the certificate manager extension 220A communicates the encrypted new private key and the new certificate to the security subsystem 235A of the endpoint 100A at 443. Either before or after receiving the encrypted private key and the new certificate at 443, the security subsystem 235A derives the symmetric key needed to decrypt the new encrypted private key using the old private key. As previously described, if a salt 491 is used in combination with the old private key to generate the symmetric key, then it may be provided via an out-of-band communication channel and/or may be encrypted with the old public key (and decrypted by the security subsystem 235A with the old private key). The encrypted salt 491 (if used) may also be provided from the certificate management service 170.

At 444, the security subsystem 235A makes a backup copy of the old private key and certificate and, at 445, decrypts the new private key with the derived symmetric key. If successful, the security subsystem 235A replaces the old private key and certificate with the new private key and certificate, respectively.

Figure 4C:
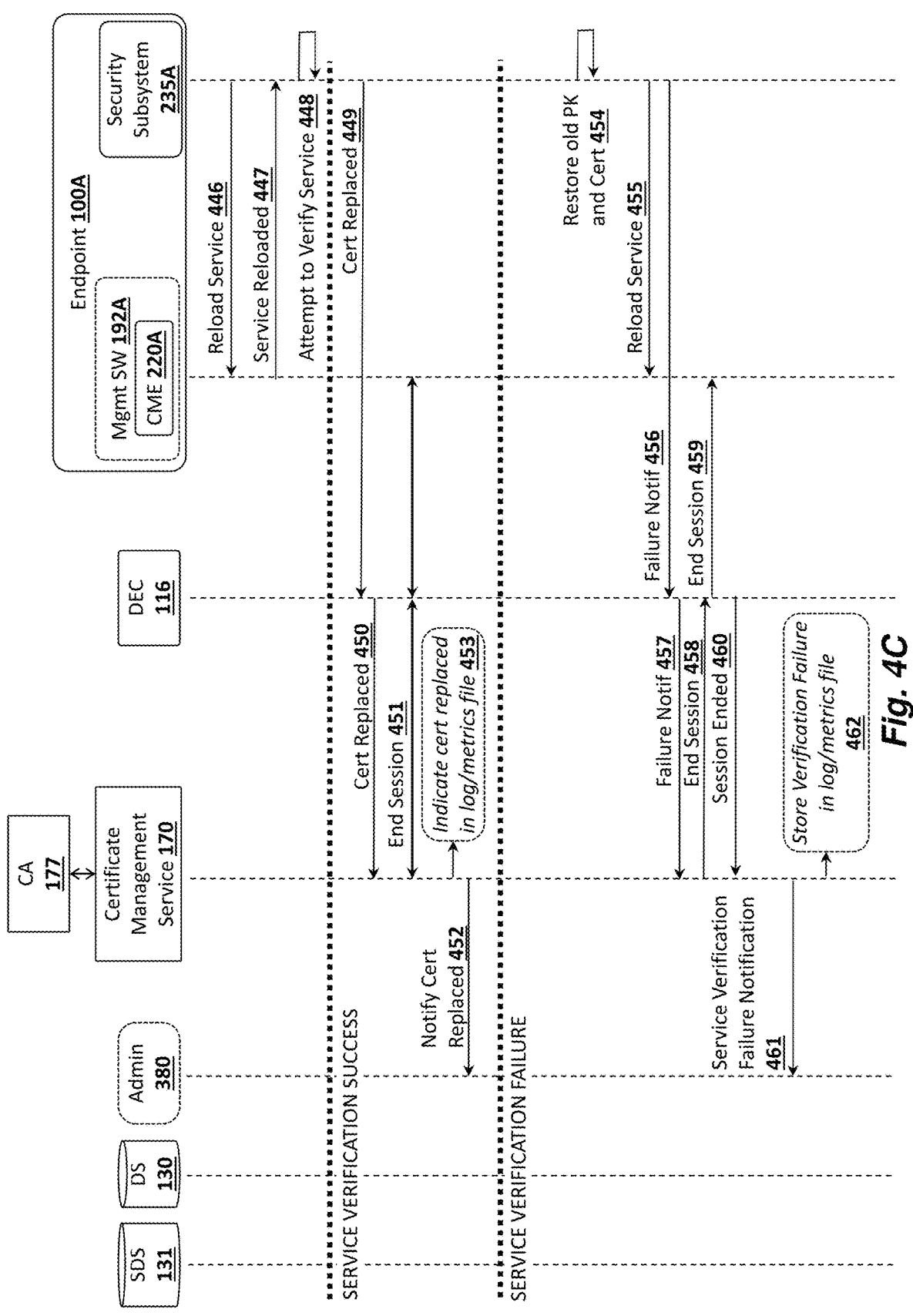
FIG. 4C illustrates a sequence of operations to update any necessary service configurations and transmit a request to restart or reload the associated security service modules according to some embodiments.

Turning to FIG. 4C, after the new private key and certificate are installed on the endpoint 100A, the security subsystem 235A may update any necessary service configurations and, at 446, transmit a request to restart or reload the associated security service modules (e.g., any software/firmware modules associated with the security subsystem 235A, potentially including the certificate manager extension 220A). A message 447 is sent when the restart/reload is complete and, at 448, the security manager verifies the new services. For example, the security subsystem 235A may verify that the security components including the security subsystem 235A and/or the certificate manager extension 220A are healthy and responding with the new replacement certificate and any configured intermediates. The security subsystem 235A or certificate manager extension 220A may also perform a hash operation to validate the security subsystem or associated software modules (e.g., generating a hash value over the modules and comparing the hash value to one previously generated from a known valid instance of the modules). Various other techniques may be used to validate the various software or firmware entities.

If the health verification succeeds at 448, then a certificate replaced message 449-450 is sent via the DEC interface 116 to the certificate management service 170, which terminates the session at 451, notifies the admin 480 that the certificate has been replaced at 452 and stores an entry indicating the certificate replacement in the log/metrics file at 453.

In response to a verification failure at 448, the security manager restores the old private key and certificate at 454 and reloads the security service modules at 455. The client management software 192A transmits a failure notification 456-457 to the certificate management service 170 via the DEC interface 116, which ends the session at 458-460, notifies the admin 380 of the service verification failure at 461 and stores the verification failure in the log/metrics file at 462.

Figure 4D:
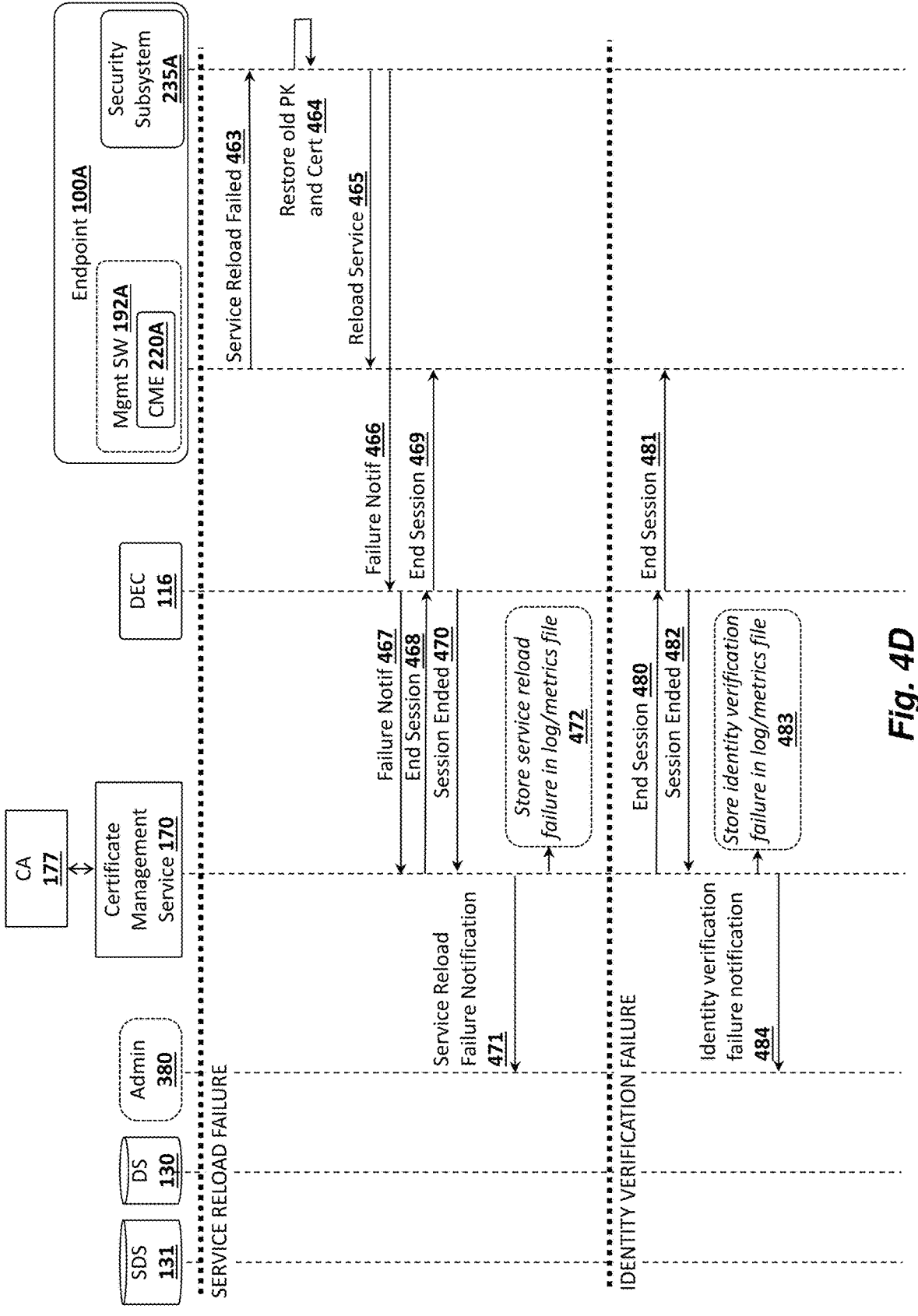
FIG. 4D illustrates a sequence of operations to perform responsive to a failure to properly reload following installation of a new private key and certificate according to some embodiments.

As illustrated in FIG. 4D, if the client management software 192A detects that the security service, including the security subsystem 235A and/or the certificate manager extension 220A fail to reload properly following installation of the new private key and certificate, then a service reload failure is generated. In response to a service reload failure notification 463 from the client management software 192A, the security subsystem 235A restores the old private key and certificate at 464 and reloads the security service modules at 465. The client management software 192A transmits a failure notification 466-467 to the certificate management service 170 via the DEC interface 116, which ends the session at 468-470, notifies the admin 380 of the service verification failure at 471 and stores the verification failure in the log/metrics file at 472.

In various embodiments, the same set of operations shown in FIG. 4C and at 463-472 in FIG. 4D may be performed to reload and verify the services running on endpoint 100C/D which generated the public/private key pair and CSR, after the new private key and certificate are installed at 345 in FIG. 3B.

As shown in the bottom half of FIG. 4D, in response to an identity verification failure at 439 in FIG. 4B, the current session between the certificate management service 170 and client management software 192A is terminated via messages 481-483. An indication of the identity verification failure is stored in the log/metrics file at 484 and a notification message indicating the identity verification failure is sent to the admin 480 at 485.

Thus, several various validation checks are performed to ensure that the keys and certificates of each endpoint are protected. In some embodiments, the validation checks include: validating the existing certificate chains up to a trusted CA; validating the CSR identity signature; validating the replacement CSR's signature using the embedded public key; and/or verifying that attributes/extensions match the expected output of the replacement CSR generation algorithm.

FIG. 5 illustrates a method in accordance with some embodiments. The method may be implemented within the context of the architectures described herein, but is not limited to any particular endpoint or service architecture.

At 501, an endpoint is identified with an old certificate and corresponding private key to be renewed and a session is established with the endpoint. At 502, a first set of one or more commands are sent to the endpoint to cause the endpoint to generate a new public/private key pair and corresponding CSR.

In some embodiments described herein, the endpoint may also generate a signature over the CSR using the old private key. In implementations in which the endpoint shares key pairs with other entities, a corresponding symmetric key may be generated (e.g., derived from the old prior key, and potentially a salt, using HKDF or similar key derivation function) and used to encrypt the new private key.

At 503 the CSR is received and provided to the authorized certificate authority (CA) and the new certificate generated by the CA is received on behalf of the endpoint.

At 504, a second set of one or more commands are sent to the endpoint with the new certificate. At 506, the endpoint replaces the old certificate with the new certificate and the old private key with the new private key generated at 502.

While not explicitly described in FIG. 5, validation checks may be performed at various stages. For example, at 503, before providing the CSR to the CA, the CSR signature may be verified using the endpoint's old public key. Additionally, at 505, before sending the second command to the endpoint with the new certificate, the identity of the endpoint may be verified by transmitting an identity challenge including a nonce which the endpoint signs with the old private key and returns the signature. The signature can then be verified using old public key before sending the encrypted new private key and new certificate. Additionally, at 506, various security-related modules may be restarted after the old private key and certificate are replaced with the new private key and certificate, and the restarted modules may be validated before the new private key and certificate are finally accepted (e.g., as described with respect to FIGS. 4C-D).

In implementations where a certificate is shared by multiple endpoints, a corresponding symmetric key may be generated (e.g., derived from the old prior key, and potentially a salt, using HKDF or similar key derivation function) and used to encrypt the new private key. The encrypted new private key may be sent to these endpoints with instructions to generate the symmetric key needed to decrypt the encrypted new private key. Any endpoints with access to the old private key can then generate the symmetric key and decrypt the new private key. As mentioned, if a salt is used to generate the symmetric key, the salt may be encrypted by the endpoint on which it was generated using the public key of the old public/private key pair and the other endpoints can decrypt it using the corresponding old private key.

In various embodiments described herein, the private key that resides on each endpoint need not leave the endpoints unencrypted.

Private keys stored in the Windows LocalMachine store (or even in files without password protection on the endpoint's storage device) can be accessed by the certificate manager extension 220 without significant security overhead (assuming the certificate manager extension 220 is running at a sufficient privilege level).

In other instances, the private keys/certificates may be password protected and/or may be stored in a Hardware Security Module (HSM), Java keystore, or other non-trivial key storage mechanism. For these endpoints, embodiments of the certificate manager extension 220 may be configured to access these storage devices, such as by registering the certificate manager extension 220 with the endpoint security service which includes the security subsystem 235. On some endpoint platforms, an API is exposed to access the security subsystem 235 with a limited set of functions once the certificate manager extension 220 has been verified as a trusted entity by the endpoint security service. However, the underlying principles of the invention are not limited to the specific manner in which access to the endpoint certificates and keys is provided to the certificate manager extension 220.

In some embodiments, the client management software 192A-D and/or associated endpoint management tools are configured to identify certificates suitable for renewal management as described herein. For example, the management software/endpoint management tools may ensure that each existing certificate (i) validates to an authorized CA, (ii) is served by a supported transport layer security (TLS) service module, and (iii) includes access to the private key (among other things). When a suitable certificate is identified, the certificate management service 170 collects the certificate and any configured intermediate CA certificates and reverifies that the certificate is suitable for renewal management as described herein. The intermediate CA certificates are used by the certificate management service 170 to validate the existing certificate chains up to an authorized CA. In order to securely renew certificates that are shared among multiple endpoints, the endpoint is asked to provide a cryptographic signature of the CSR using the existing private key. This signature will be verified using the existing public key, confirming that the CSR came from an endpoint that has the existing private key. Thus, the certificate management service 170 checks this signature before moving forward with the CSR.

In some embodiments, endpoint tooling may be used to identify candidate certificates served by local services, and locate their configurations including at-rest certificates and private keys. Validity checks may be performed to narrow the focus to certificates that have come from the organization's list of authorized CAs. When a suitable candidate certificate and configuration is discovered, this information is communicated to the certificate management service 170, which may perform further validations as described herein.

In some implementations, a candidate certificate is considered suitable for renewal management as described herein based on consideration of one or more of the following variables:

(i) There is at least one listening TLS service application/module that serves up a candidate certificate.

(ii) The candidate certificate's chain validates up to a root in one of the authorized CAs; this validation may use intermediate CAs serviced by the TLS service application/module (which should be found in the TLS service application/module configuration).

(iii) The certificate management service 170 is capable of managing certificates for the TLS service application/module. Additionally, or alternatively, the TLS service application/module may have a standard mechanism for service process lifecycle management (ex: systemd, windows service API). For example, the certificate management service 170 may not manage certificates for a service that has not been started via a standard secure process. Another variable is whether the TLS service application/module configuration is readable and updatable (e.g., Apache2 and nginx use a file-based configuration).

(iv) Using the TLS service application/module configuration, it is possible to determine the location of the at-rest candidate certificate, at-rest intermediate certificates, and its at-rest private key. For example, Apache2 and nginx expect certificates and private-keys to be stored in the filesystem. The certificate and intermediate certificates are often stored in the same file. For windows services (IIS, etc), certificates and their private keys are typically contained within a certificate store, which may be only accessible via an API. In these implementations, the certificate manager extension 220 may be configured to access this API. Intermediate certificates may be stored in an "Intermediate Certification Authorities" store.

(v) The at-rest candidate certificate is readable, and has been confirmed to be identical to the candidate certificate served by the certificate.

(vi) The at-rest intermediate CA certificates are readable.

(vii) The At-Rest Private Key is accessible. For example, the at-rest private key may be used for cryptographic signing and signature verification. Optionally, the at-rest private key may be read in full to facilitate the creation of a derived symmetric key, as previously described.

(vii) The at-rest candidate certificate and at-rest private key are cryptographically confirmed to be a valid key pair.

(viii) The endpoint tools verify that the at-rest candidate certificate validates up to an authorized CA root, including the at-rest intermediate CA certificates in the pool of intermediates.

In some embodiments, when the certificate management service 170 determines that a candidate certificate is suitable for renewal management, the certificate management service 170 may retrieve the candidate certificate and its intermediate CA certificates from the endpoint as described above. The certificate management service 170 then verifies the candidate certificate chains up to an authorized CA root, including the intermediate CA certificates in the pool of intermediates. The candidate certificate is then made available for renewal by the certificate management service 170.

The following specific details are used for one implementation of the replacement key pair generation as described herein (e.g., in response to message 309 in FIG. 3A). These specific details are provided for the purposes of explanation but are not required for complying with the underlying principles of the invention:

Inputs:
a. Existing certificate

Outputs:
a. Replacement key pair

Process:
a. For existing certificate's public key algorithm:
i. Rivest-Shamir-Adleman (RSA):
1. Generate RSA keypair with bit length of Max (Existing Certificate's RSA Public Key length, 2048)
ii. Elliptic Curve Digital Signature Algorithm (ECDSA):
1. Generate ECDSA keypair with the same Curve as Existing Certificate's ECDSA Public Key Curve.

The following specific details are used for generating the replacement CSR in some implementations (e.g., in response to message 311 in FIG. 3A). The replacement CSR may contain the same subject, and copies of a limited set of extensions from the existing certificate. Additionally, the signature algorithm is the same as, or stronger than, that of the existing certificate. These attributes will be validated by the service.

Inputs:
a. Existing Certificate
b. Replacement Key Pair

Outputs:
a. A PEM-encoded Replacement CSR, signed using the replacement key pair's private key.

Process:
a. Properties of the CSR are generally taken from the existing certificate:
i. Subject: Existing Certificate's Subject, verbatim.
ii. Public Key: Replacement Key Pair's public key
iii. Public Key Algorithm: Replacement Key Pair's public key algorithm.
iv. Signature Algorithm: Existing Certificate's Signature Algorithm, adjusted to a minimum SHA256 hash for RSA and ECDSA.
1. RSA w/MD2, MD5, SHA1→RSA w/SHA256
2. ECDSA w/SHA1→ECDSA w/SHA256
v. Extensions: Copies of only the following extensions from the Existing Certificate, if they exist:
1. Subject Alternative Name (oid: 2.5.29.17)
2. Key Usage (oid: 2.5.29.15)
3. Extended Key Usage (oid: 2.5.29.37)
4. Microsoft Enrollment Certificate Type (oid: 1.3.6.1.4.1.311.20.2)

a. For Microsoft Certificate Authorities, this conveys the Certificate Template name used (or to be used) to generate the certificate.
b. The CSR is signed using the Replacement Key Pair's private key.

As with the key pair generation details, these CSR details are provided for the purposes of explanation but are not required for complying with the underlying principles of the invention, which is not limited to any particular encryption protocols.

In some embodiments, the certificate management service 170 retain copies of the replacement certificate, intermediates (e.g., stored in the data store 130 as described above), and the encrypted replacement private key (e.g., stored in the secure data store 131) for a defined period of time (e.g., 15-30 days by default, but user configurable for different time periods) to allow for offline endpoints to come back online and have the certificate replaced. After the configured time span, the certificate management service 170 deletes the replacement private key, replacement certificate, and intermediates. The certificate management service 170 keeps track of the deletion of the replacement certificate and replacement private key, tying it back to the SHA256 fingerprint of the existing certificate. This allow the certificate management service 170 to track that a replacement for this certificate has already occurred. For endpoints that come online past the storage window, options may be presented to the network administrator 380 including an option to request a new replacement certificate.

In some embodiments, the certificate management service 170 monitors for usage of the replaced certificates by services (not at rest) on endpoints. When the certificate management service 170 determines that there are no more services using the existing certificate, and the replacement certificate and replacement private key have been removed (as outlined above), the certificate management service 170 will issue a scheduled action to remove the existing certificate and existing private key from the endpoints. The action can include a verification query to ensure that the existing certificate and existing private key are no longer in use by any service on the endpoint.

Example Interfaces and Protocols for Communication Between the Management Service and the Management Software As mentioned with respect to FIG. 1, the management service 110 may communicate with endpoints 100A-D using one or more different interfaces and protocols; and where there are multiple, they may be selected from based on the type of information to be exchanged. For example, some embodiments are implemented as a hub and spoke organization where the client management software 192 on each of the endpoints 100 communicates its information with an electronic device, acting as server (e.g., the above discussed DEC interface 116). Some embodiments apply a hierarchical organization of the client management software 192 (e.g., in which instances of the client management software lower in the hierarchy transmit requested information to instances higher in the hierarchy); and this may also make use of the DEC interface 116. In some embodiments, the management software 192 is implemented to operate as a linear chain, also referred to as a ring, neighborhood, orbit, arc, series, propagation, propagation channel (e.g, thus, communication is from and toward the linear chain interface.

As described above with respect to the linear chain interface 115 in FIG. 1, rather than a server communicating with the client management software 192 on each endpoint 100, a message is passed along a sequence of the endpoints, collecting data as it passes from one endpoint to the next, until the final endpoint in the linear chain is reached, which transmits the collected data toward the management service 110 (e.g., sent directly or sent through a gateway server). This mode of data collection reduces network traffic and increases speed. The client management software 192 can be implemented such that the sequence of endpoints is self-forming, and thus can handle a non-static collection of endpoints. There are many variations on the linear chain approach that may be used. In addition to the techniques described below, in some embodiments a linear chain may be implemented as described in: application Ser. No. 16/854, 844, issued as U.S. Pat. No. 11,172,470, and titled System, Security and Network Management Using Self-Organizing Communication Orbits in Distributed Networks; application Ser. No. 15/686,054, issued as U.S. Pat. No. 10,485,536, and titled Fast Detection and Remediation of Unmanaged Assets; application Ser. No. 16/917,800, issued as U.S. Pat. No. 11,258,654, and titled Parallel Distributed Network Management; and application Ser. No. 16/943,291, issued as U.S. Pat. No. 11,343,355, titled Automated Mapping of Multi-Tier Applications in a Distributed System.

According to a first variation, the sequence can be viewed as having a head (referred to as the head electronic device, head endpoint, head of the linear chain, head of the sequence) and a tail (referred to in similar fashion where "head" is replaced with "tail"). The message is sent to or starts at the head. Responsive to the message, the head electronic device performs the scan and adds data to the message. The message is then forwarded to the next endpoint in the sequence, which does the same; as such, the message is accumulating data as it is sent along the sequence. Put another way, each of the endpoints 100A-D receiving a message from its upstream neighbor acts upon the message by providing an update to the message based on its local state, performing some aggregation of the information in the message (e.g., by adding to or modifying aggregated results already included in the message as received from its upstream neighbor), and/or forwarding the message to its downstream neighbor along the linear chain. Thus, the plurality of endpoints are caused to pass a message from one of the plurality of endpoints to a next one of the plurality of endpoints according to a predetermined sequence of the plurality of endpoints to determine the second information, where each of the plurality of endpoints modifies the message based on the first information regarding that endpoint before sending the message to the next one of the plurality of endpoints according to the predetermined sequence. Once the message reaches the tail endpoint, it does the same and then causes the message to be sent toward the management service 110. This head/tail sequence approach is roughly reflected in FIG. 1 via an arrowed line from the client management software 192A to the management software 192B, an arrowed line from the management software 192B along the " . . . " (representing a set of zero or more endpoints that are also part of the sequence) to endpoint 100C, and an arrowed line from the endpoint 100C to the endpoint 100D. Thus, there is a respective communication channel between each pair of the endpoints in the sequence. According to another variation, a similar sequence approach may be used, but the tail endpoints sends the message back to the head endpoint for it to cause that message to be forwarded toward the management service 110.

In some embodiments, while queries are passed from endpoint to endpoint along a linear communication orbit, individual queries can be directed to or targeted to a subset of the endpoints in a linear communication chain, so that only a specified subset of the endpoints in the linear chain process the check.

As previously indicated, communications from and toward the management service 110 to the client management software 192A-192D may pass through one or more intermediary devices. For instance, there may be a gateway server that: 1) receives request message 160A and provides it to client management software 192A; and 2) receives the response 161A from client management software 192D and provides it to management service 110. This gateway server may be on the premises of the owner/operator of the endpoints 100A-100D. Alternatively, the endpoints 100A-100D may communicate more directly with the management service 110.

In some embodiments, the self-forming aspect of the linear chain may be implemented via: 1) an endpoint that acts as a server and that facilitates the creation and maintenance of one or more of the linear chains (this endpoint may be the one acting as the gateway server or an elected one of the endpoints 100A-100D); and/or 2) each of the endpoints 100A-100D includes software (e.g., through application of a set of predetermined organization rules) that cause that endpoint to find its immediate neighbors and coordinate with these immediate neighbors to self-organize into a linear chain. In some embodiments, the linear chain may grow or contract as endpoints join and leave network connecting endpoints 100A-100D (e.g., a local area network (LAN) that is non-static), through the independent local actions of the endpoints themselves.

While FIG. 1 illustrates a single linear chain, in some embodiments more linear chains formed from other endpoints may communicate with the management service 110. Further, some embodiments include additional servers (sometimes called zone servers) that each are to pass the information (e.g., in a collated form or each message) from respective sets of linear chains to the gateway server (such embodiments may be considered a cross between a hierarchical organization where linear chains can be viewed as leaf nodes or as extending from the leaf nodes of the hierarchy).

Example Electronic Devices and Machine-Readable Media

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, internet-of-things (IoT) devices (e.g., wearables, augmented reality (AR) devices, virtual reality (VR) devices, mixed reality (MR) devices), industrial IoT (IIoT) devices (e.g., operational technology (OT) devices enabled by IoT, which sometimes are referred to as IoT/OT devices), healthcare IoT devices (also referred to as internet of medical things (IoMT)) devices, IoT gateways, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6:
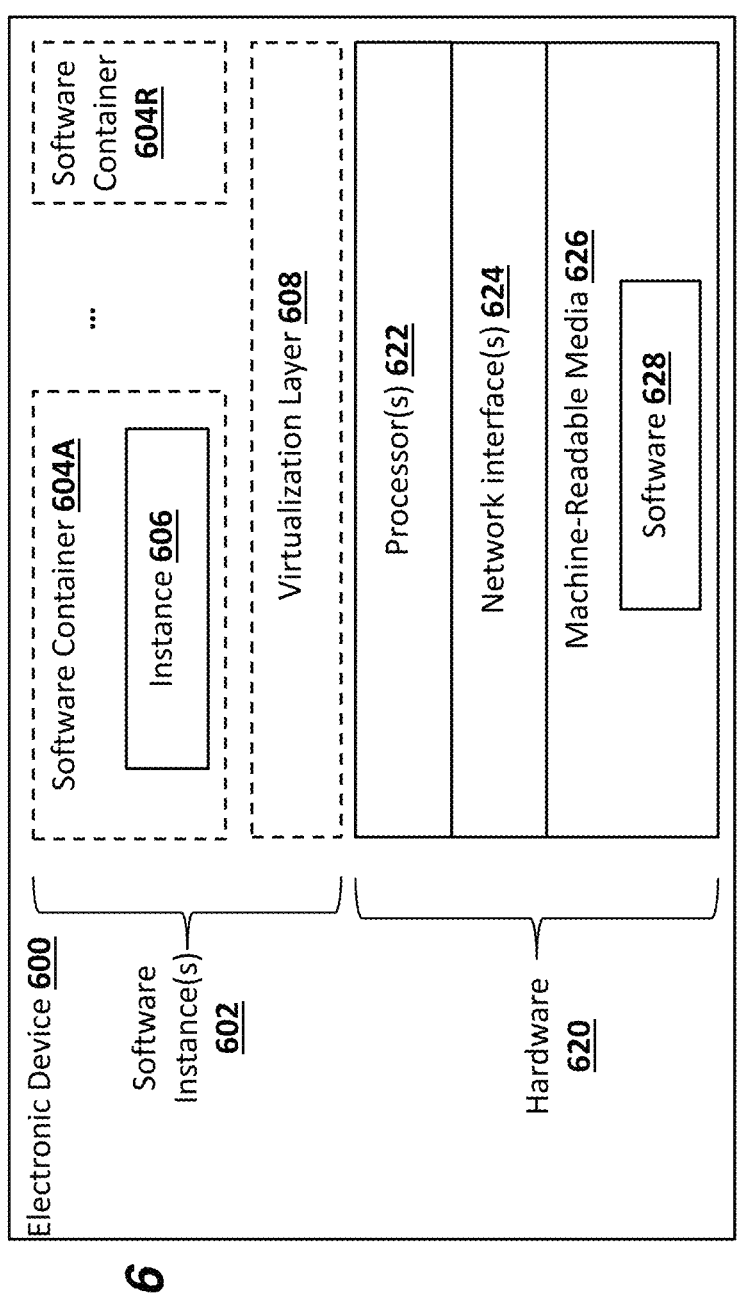
FIG. 6 is a block diagram illustrating an electronic device according to some example embodiments.

FIG. 6 is a block diagram illustrating an electronic device 600 according to some example embodiments. FIG. 6 includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients/endpoints and the management service 110 may be implemented in one or more electronic devices 600. In one embodiment: 1) each of the clients is implemented in a separate one of the electronic devices 600 (e.g., in end user devices where the software 628 represents the software to implement clients to interface directly and/or indirectly with the management service 110 (e.g., software 628 represents the client management software 192)); 2) the management service 110 is implemented in a separate set of one or more of the electronic devices 600 (e.g., a set of one or more server devices where the software 628 represents the software to implement the management service 110); and 3) in operation, the electronic devices implementing the clients and the management service 110 would be communicatively coupled (e.g., by a network) and would establish between them (or through one or more other layers and/or or other services) connections/sessions. Other configurations of electronic devices may be used in other embodiments (e.g., an embodiment in which the client and the management service 110 are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative embodiments of an electronic device may have numerous variations from that described above. For example, customized hardware and/or accelerators might also be used in an electronic device.

Example Environments

Where the management service 110 is a cloud service, there will be hardware (e.g., a set of one or more server devices) and software to provide management service 110. In some embodiments, this hardware and software are in one or more datacenter(s). These datacenter(s) may be: 1) first party datacenter(s), which are datacenter(s) owned and/or operated by the same entity that provides and/or operates some or all of the software that provides the management service 110 (including the certificate management service 170); and/or 2) third-party datacenter(s), which are datacenter(s) owned and/or operated by one or more different entities than the entity that provides the management service 110 (e.g., the different entities may host some or all of the software provided and/or operated by the entity that provides the management service 110). For example, third-party datacenters may be owned and/or operated by entities providing public cloud services (e.g., Amazon.com, Inc. (Amazon Web Services), Google LLC (Google Cloud Platform), Microsoft Corporation (Azure)).

The provider of the management service 110 (including the certificate management service 170) may provide the client management software 192 to one or more of organizations for those organizations to analyze the electronic devices (e.g., endpoints) within their own enterprise networks. For example, each of a number of organizations may operate their own enterprise networks, but all of these organizations may be customers of the provider of the management service 110. In which case, each of these organizations installs the client management software 192 on some or all the electronic devices within their respective enterprise network that are to operate as endpoints relative to the management service 110. Also, in those enterprise networks in which a gateway server is used to communicate with the management service 110, such a gateway server is installed (be it as a virtual server or in a separate server electronic device).

While the management service 110 includes the certificate management service 170, some embodiments support additional services such as: asset discovery and inventory (also known as endpoint mapping); client management (including one or more of bare metal provisioning of new system and patching); monitoring activity in real time and reporting potential malicious behavior; identifying sensitive files on endpoints when they shouldn't be there (including looking inside of files); and threat hunting.

A user of an electronic device within or outside one of the networks 184 may communicate with the management service 110 using TCP/IP (Transfer Control Protocol and Internet Protocol) and, at a higher network level, use other networking protocols to communicate, such as Hypertext Transfer Protocol (HTTP), a remote procedure call (RPC) framework (e.g., gRCP), an application program interface (API) based upon protocols such as Representational State Transfer (REST), etc. In an example where HTTP is used, an HTTP client, commonly referred to as a "browser," may be used on an electronic device to communicate HTTP messages with the management service 110, thus allowing a user to access, process, and view information via pages and applications provided as part of the management service 110, including allowing a user to interact with various GUI pages provided by the management service 110. Such a user may be an employee of the provider of the management service 110 and/or an employee of an organization that was provided the client management software 192 to install on endpoints within that organization's network.

CONCLUSION

In the above description, numerous specific details such as resource partitioning/sharing/duplication embodiments, types and interrelationships of system components, and logic partitioning/integration choices are set forth in order to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether or not explicitly described.

For example, the figure(s) illustrating flow diagrams sometimes refer to the figure(s) illustrating block diagrams, and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A non-transitory machine-readable storage medium that provides instructions that, when executed by a set of one or more processors, are configurable to cause said set of one or more processors to perform operations comprising:
    identifying a first managed endpoint associated with a current certificate and corresponding current private key to be renewed;
    sending a first one or more messages to the first managed endpoint to cause the first managed endpoint to generate a new public/private key pair including a new private key and a corresponding certificate signing request (CSR), generate a corresponding symmetric key based on the corresponding current private key, and encrypt the new private key with the corresponding symmetric key to generate an encrypted new private key;
    providing the CSR to a certificate authority (CA) on behalf of the managed endpoint and receiving a corresponding new certificate from the CA;
    sending a second one or more messages to the managed endpoint to cause the managed endpoint to replace the current certificate with the corresponding new certificate;
    receiving a copy of the encrypted new private key from the first managed endpoint; and
    providing the copy of the encrypted new private key and the corresponding new certificate to a second managed endpoint, the second managed endpoint to replace the current certificate with the corresponding new certificate, generate the corresponding symmetric key with the corresponding current private key, decrypt the encrypted new private key with the corresponding symmetric key, and replace the corresponding current private key with the new private key.

2. The non-transitory machine-readable storage medium of claim 1, wherein the first one or more messages are sent to a certificate manager operable on the managed endpoint, the certificate manager to interact with a security subsystem of the managed endpoint to cause the security subsystem to generate the new public/private key pair and the CSR.

3. The non-transitory machine-readable storage medium of claim 2, wherein the first one or more messages are further to cause the managed endpoint to generate a signature over the CSR with the corresponding current private key, the non-transitory machine-readable storage medium including instructions that, when executed by the set of one or more processors, are configurable to cause said set of one or more processors to perform additional operations comprising:
    verifying the signature using a current public key associated with the corresponding current private key.

4. The non-transitory machine-readable storage medium of claim 3, wherein the security subsystem includes a hardware-based security manager to restrict access to encryption keys and certificates, including the current certificate and the corresponding current private key, the certificate manager to make calls via an application programming interface (API) of the hardware-based security manager to cause the managed endpoint to generate the new public/private key pair and CSR, generate the signature over the CSR with the corresponding current private key, generate the corresponding symmetric key based on the corresponding current private key, and to further cause the managed endpoint to encrypt the new private key with the corresponding symmetric key.

5. The non-transitory machine-readable storage medium of claim 2, wherein the certificate manager is to access a configuration file on the managed endpoint to determine a storage location of the current certificate and the corresponding current private key.

6. The non-transitory machine-readable storage medium of claim 1, wherein the corresponding symmetric key is generated using a key derivation function (KDF) using the corresponding current private key as an input.

7. The non-transitory machine-readable storage medium of claim 6, wherein the KDF comprises a hashed message authentication code KDF (HKDF) which is to use a random salt value in addition to the corresponding current private key as input to generate the corresponding symmetric key.

8. The non-transitory machine-readable storage medium of claim 1, further including instructions that, when executed by the set of one or more processors, are configurable to cause the set of one or more processors to perform additional operations comprising:
    automatically determining, based on a data structure that stores indications of which managed endpoints share key pairs, to the perform the providing of the copy of the encrypted new private key and the corresponding new certificate to the second managed endpoint.

9. The non-transitory machine-readable storage medium of claim 1, wherein the managed endpoint comprises one of a plurality of managed endpoints and the current certificate comprises one of a plurality of certificates of the plurality of managed endpoints, wherein the non-transitory machine-readable storage medium includes instructions that, when executed by the set of one or more processors, are configurable to cause said set of one or more processors to perform additional operations comprising:
    querying the plurality of managed endpoints to identify validity information associated with the plurality of certificates;

using the validity information to identify a subset of certificates for which certificate renewal is needed, including the current certificate;

for each certificate in the subset of certificates, performing operations to acquire a new certificate on behalf of a corresponding managed endpoint of the plurality of managed endpoints.

10. A method for a cloud-based management service to acquire certificates on behalf of a plurality of endpoints, comprising:

identifying a first managed endpoint associated with a current certificate and corresponding current private key to be renewed;

sending a first one or more messages to the first managed endpoint to cause the first managed endpoint to generate a new public/private key pair including a new private key and a corresponding certificate signing request (CSR), generate a corresponding symmetric key based on the corresponding current private key, and encrypt the new private key with the corresponding symmetric key to generate an encrypted new private key;

providing the CSR to a certificate authority (CA) on behalf of the managed endpoint and receiving a corresponding new certificate from the CA;

sending a second one or more messages to the managed endpoint to cause the managed endpoint to replace the current certificate with the corresponding new certificate;

receiving a copy of the encrypted new private key from the first managed endpoint; and providing the copy of the encrypted new private key and the corresponding new certificate to a second managed endpoint, the second managed endpoint to replace the current certificate with the corresponding new certificate, generate the corresponding symmetric key with the corresponding current private key, decrypt the encrypted new private key with the corresponding symmetric key, and replace the corresponding current private key with the new private key.

11. The method of claim 10, wherein the first one or more messages are sent to a certificate manager operable on the managed endpoint, the certificate manager to interact with a security subsystem of the managed endpoint to cause the security subsystem to generate the new public/private key pair and the CSR.

12. The method of claim 11, wherein the first one or more messages are further to cause the managed endpoint to generate a signature over the CSR with the corresponding current private key, the method further comprising:

verifying the signature using a current public key associated with the corresponding current private key.

13. The method of claim 12, wherein the security subsystem includes a hardware-based security manager to restrict access to encryption keys and certificates, including the current certificate and the corresponding current private key, the certificate manager to make calls via an application programming interface (API) of the hardware-based security manager to cause the managed endpoint to generate the new public/private key pair and CSR, generate the signature over the CSR with the corresponding current private key, generate the corresponding symmetric key based on the corresponding current private key, and to further cause the managed endpoint to encrypt the new private key with the corresponding symmetric key.

14. The method of claim 11, wherein the certificate manager is to access a configuration file on the managed endpoint to determine a storage location of the current certificate and the corresponding current private key.

15. The method of claim 10, wherein the corresponding symmetric key is generated using a key derivation function (KDF) using the corresponding current private key as an input.

16. The method of claim 15, wherein the KDF comprises a hashed message authentication code KDF (HKDF) which is to use a random salt value in addition to the corresponding current private key as input to generate the corresponding symmetric key.

17. The method of claim 10, further comprising:

automatically determining, based on a data structure that stores indications of which managed endpoints share key pairs, to the perform the providing of the copy of the encrypted new private key and the corresponding new certificate to the second managed endpoint.

18. The method of claim 10, wherein the managed endpoint comprises one of a plurality of managed endpoints and the current certificate comprises one of a plurality of certificates of the plurality of managed endpoints, wherein the method further comprising:

querying the plurality of managed endpoints to identify validity information associated with the plurality of certificates;

using the validity information to identify a subset of certificates for which certificate renewal is needed, including the current certificate;

for each certificate in the subset of certificates, performing operations to acquire a new certificate on behalf of a corresponding managed endpoint of the plurality of managed endpoints.

* * * * *